United States Patent [19]

Schwind et al.

[11] Patent Number: 5,880,235

[45] Date of Patent: Mar. 9, 1999

[54] COPOLYMERS USEFUL FOR PRODUCING CAST GLASS AND THERMALLY DIMENSIONALLY STABLE MOLDING MATERIALS

[75] Inventors: Helmut Schwind, Hanau; Dirk Hauch, Rodenbach; Thomas Hasskerl, Kronberg; Klaus Dorn, Hanau; Mathias Hopp, Biebergemund, all of Germany

[73] Assignee: Agomer Gesellschaft mit beschrankter Haftung, Hanau, Germany

[21] Appl. No.: 586,177

[22] Filed: Jan. 17, 1996

[30] Foreign Application Priority Data

Jan. 17, 1995 [DE] Germany .................. 195 01 182.1

[51] Int. Cl.[6] .................................................. C08F 224/00
[52] U.S. Cl. .............................................................. 526/266
[58] Field of Search ............................................... 526/266

[56] References Cited

U.S. PATENT DOCUMENTS 2,624,723  1/1953  McGraw ................................ 260/88.3

FOREIGN PATENT DOCUMENTS 0641310  8/1950  United Kingdom .
641310  8/1950  United Kingdom .

OTHER PUBLICATIONS

Koinuma et al., "Alternating Copolymerization of α–Methylene–γ–butyrolactone with Styrene", Makromol. Chem., Rapid Commun. 3, 3–11–315 (1982).

*Primary Examiner*—Jeffrey Smith
*Assistant Examiner*—Wu C. Cheng
*Attorney, Agent, or Firm*—Pillsbury Madison & Sutro LLP

[57] ABSTRACT

The invention relates to copolymers for producing cast glass or thermally dimensionally stable formed materials.

24 Claims, No Drawings

COPOLYMERS USEFUL FOR PRODUCING CAST GLASS AND THERMALLY DIMENSIONALLY STABLE MOLDING MATERIALS

FIELD OF THE INVENTION

The invention relates to copolymers that are useful in producing thermally dimensionally stable molding materials, that is, formed materials having an elevated thermal dimensional stability (i.e., elevated heat deflection temperature).

BACKGROUND OF THE INVENTION

It is conventional to use polymethylmethacrylate (PMMA) in the manufacture of molding materials which make plastic mold parts. The resulting molded articles often exhibit a high transparency and an excellent optical quality. Unfortunately, the usefulness of PMMA molding materials is limited by the softening properties of PMMA: at temperatures above approximately 115° C. PMMA softens and is no longer useful. Furthermore, the "service temperature" (i.e., the highest temperature at which PMMA can be stored for any reasonable length of time) is even lower than the softening temperature, such that at temperatures >95° C. PMMA exhibits deficient storage life and serviceability.

Consequently, at higher temperatures other plastics must be used. For example, polycarbonates having a Vicat temperature of approximately 150° C. can be considered as transparent plastics for this purpose. However, like PMMA, the service temperature of polycarbonates is far less than the Vicat temperature—about 20° C. lower (or approximately 130° C.). Compared to PMMA, polycarbonates are very sensitive to scratches and are significantly less resistant to atmospheric corrosion.

Other transparent plastics having a high thermal dimensional stability include polymethacrylimides, which have a Vicat temperature of up to 175° C. at complete imidization. Polymethacrylimides are obtained by reacting methacrylic polymerizates with a primary amine in a reactor. The imide structures form on the side arms of the PMMA macromolecule. The Vicat temperature rises with the degree of imidization.

Polymethacrylimides have greater water absorption properties than PMMA. The production and properties of this polymer are known from the patent DE-A-40 02 904.

DE-A-26 52 118 describes a method for imidization of polymerizates of acrylic- and/or methacrylic acid esters, novel, imidized thermoplastic polymerizates and a molding material of such polymerizates. Such polymethacrylimides with Vicat temperatures of between 134°–163° C. are commercially available.

It is known that the thermal dimensional stability of PMMA can be increased by copolymerization of methylmethacrylate (MMA) with suitable monomers. For example, MMA can be copolymerized with styrene and maleic acid anhydride. French patent 1,476,215 describes copolymers of MMA with styrene and maleic acid anhydride, wherein the copolymers have a Vicat temperature between 130° and 145° C. However, due to the aromaticity of the copolymer, the resulting plastic does not resist atmospheric corrosion as well as plastics formed with PMMA.

British patent 641,310 describes the mass polymerization of α-methylene-γ-butyrolactone and α-methylene-γ-methyl-γ-butyrolactone. Dibenzoyl peroxide, azo-bis-isobutyronitrile or radiation with a mercury lamp are described as initiators for the radical polymerization. Similarly, U.S. Pat. No. 2,624,723 describes homopolymers of α-methylene-γ-butyrolactone and α-methylene-γ-methyl-γ-butyrolactone. This patent also describes a copolymer of α-methylene-γ-butyrolactone with acrylonitrile. The polymers are produced by radical polymerization with peroxides as initiators, or by irradiation with UV light. The compounds in these two patents are characterized by high glass transition temperatures. They are hard and brittle and have a slightly yellow color. In addition, these polymers and copolymers are produced without chain transfer agents, and consequently have a relatively high molecular weight which makes them unsuitable as molding materials. Indeed, even their usefulness for producing cast glasses is doubtful.

Macromolecules 12, pp. 546–551 describes the homopolymer of α-methylene-γ-butyrolactone and its glass transition temperature (Tg). In this reference, a relatively high Tg of 195° C. and low solubility are indicative of considerable stiffness of the polymer chain.

Furthermore, copolymerization studies of α-methylene-γ-butyrolactone and methylmethacrylate (Polymer 20, pp. 1215–1216) showed that the former disposes over a distinctly higher reactivity than the latter.

Dent Mater 8, pp. 270–273 describes the use of exomethylene lactones as a comonomer in dental resins. It was found that exo-methylene lactones further the conversion of dental resins in the polymerization by lowering the viscosity. The result is a harder dental filling.

More specifically, the production of homopolymerizates from α-methylene-γ-butyrolactone, α-methylene-γ-phenyl-γ-butyrolactone, 3-methylene-1-oxaspiro[4.5]decan-2-one as well as methylene phthalide is known from this reference. Data for synthesis for the three latter exo-methylene lactones is also presented. The polymerization of α-methylene-γ-butyrolactone in a binary mixture with bis-GMA (2,2-bis-[4-(2-hydroxy-3-methacryloxypropoxy)phenylene]propane) or in a ternary mixture with bis-GMA and TEGDMA (triethylene glycol dimethacrylate) to obtain the corresponding copolymers is known.

According to the Dent Mater reference, the homopolymerizates of the exomethylene lactones produced are glassy, brittle materials. In contrast, the use of α-methylene-γ-butyrolactone with the bifunctional methacrylates acting as cross-linking agents results in copolymers which exhibit a higher degree of cross-linking and, consequently, an increased conversion which leads to a greater hardness. Although the hardness of the copolymers was increased as a result of increased conversion, the copolymers exhibit a thermal dimensional stability which was unsatisfactory.

Furthermore, the radical copolymerization of α-methylene-γ-butyrolactone with styrene in various ratios is known from the Journal of Polymer Science: Polymer Chemistry Edition, vol. 20, 00. 2819–2828 (1982). The experiments described in this reference served to determine the parameters of copolymerization. As the results indicate, α-methylene-γ-butyrolactone is very reactive as a cyclic analogue to MMA and has greater Q and e values than the MMA. The reference also mentions that the homopolymer of α-methylene-γ-butyrolactone is more thermally stable than the polymethylmethacrylate. According to the reference, thermal stability is understood as resistance to depolymerization or thermal decomposition. Thus, the differential thermoanalysis of the α-methylene-γ-butyrolactone homopolymerizate showed an endothermy at approximately 320° C., whereas that of PMMA was approximately 50° C. lower.

Finally, Makromol. Chem. Rapid Comm. vol. 3, pp. 311–315 (1982) describes the alternating ionic polymerization of α-methylene-γ-butyrolactone with styrene in the presence of a Lewis acid. Macromolecules 1986, 19, pp. 558–565, describes the radical copolymerization of α-methylene-δ-valerolactone with styrene. Methods of producing the homopolymer of α-methylene-γ-methyl-γ-butyrolactone by means of radical, anionic or group-transfer polymerization are accessible from Macromolecules 1984, 17, pp. 2913–2916.

SUMMARY OF THE INVENTION

The need for thermally dimensionally stable, transparent plastics with high optical quality is evident from the numerous attempts to produce same. However, none of the references mentioned above achieves the resistance to atmospheric corrosion and the processability of PMMA, while simultaneously achieving improved thermal dimensional stability and high transparency of the plastic mold part.

The inventors of the present invention therefore sought to address the problem of creating a polymeric initial material which is at least equal to the positive properties of PMMA (transparency, resistance to atmospheric corrosion, processability) but which exceeds it in thermal dimensional stability. Moreover, the inventors also sought to invent a plastic material that is suitable for producing formed materials in a casting process or for processing in plastic molding materials from which formed materials with elevated thermal dimensional stability can be manufactured in injection molding and/or in an extrusion process.

These problems in the art, among others, are solved by the copolymers of the invention, which are characterized by an elevated thermal dimensional stability. The copolymers are produced by the copolymerization of A) At least one exo-methylene lactone of the general formula I

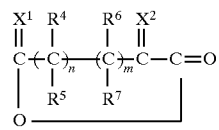

wherein
  $n=0$ or 1,
  $m=0$ or 1, and the sum $n+m$ is either 1 or 2;
  $X^1$ and $X^2$ each stand for $=CH-R^1$ or two single-bonded substituents $R^2$ and $R^3$, and only one of $X^1$ or $X^2$ is $=CH-R^1$, and where $X^1$ is $=CH-R^1$ the sum of $n+m$ is 1;
  and wherein $R^1$, $R^2$, $R^3$, $R^4$, $R^5$, $R^6$ and $R^7$ are the same or different, and can be H, $C_1-C_7$ alkyl or halogen, independently of each other, and the $C_1-C_7$ alkyl groups can be branched or linear, N-, P-, or S-heteroatom-substituted, O-alkyl substituted, or can carry halogen substitution and/or carbonyl groups,
  and wherein two of the groups $R^1$ to $R^7$ can be connected to a 5 or 6-member ring;
with
B) at least one vinylically unsaturated monomer or at least one exo-methylene lactone(s) of general formula I, wherein at least one of the exo-methylene lactone(s) of B) is different from the exo-methylene lactone(s) of A), with the proviso that copolymers of α-methylene-γ-butyrolactone with acrylonitrile, styrene, methylmethacrylate or bifunctional methacrylates, and copolymers of α-methylene-δ-valerolactone and styrene are excepted.

DETAILED DESCRIPTION OF THE INVENTION

The copolymers produced by reacting compounds A) with compounds B) comprise either (1) at least two lactones of general formula I or (2) at least one exo-methylene lactone of formula I and at least one vinylically unsaturated monomer. These copolymers exhibit an excellent thermal dimensional stability which makes them useful for producing molding materials having improved thermal dimensional stability. The copolymers comprising at least two exo-methylene lactones of formula I are more thermally dimensionally stable than PMMA with equally good transparency. Similarly, the copolymers comprising at least one exo-methylene lactone of formula I and a vinylically unsaturated monomer are more thermally dimensionally stable than the homopolymers consisting only of the vinylically unsaturated monomers alone.

If (meth-)acrylates are used as vinylic monomers, molded plastics are obtained which are thermally dimensionally stable, resistant to atmospheric corrosion, and exhibit the same good optical properties as PMMA. Plastic molding materials that are readily processable can be produced by regulating the molecular weight of these polymers. The thermal dimensional stability of the copolymers can be controlled in particular by the selection of the comonomer ratio and the position and type of the substituents in the lactone ring.

Exo-methylene lactones suitable as component A) include, among others, α-ethylidene-γ-butyrolactones or α-methylene-γ-butyrolactones of general formula II

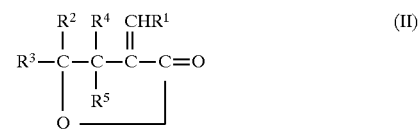

wherein
  $R^1$ stands for H or $CH_3$ and
  $R^2$, $R^3$, $R^4$ and $R^5$ have the same meaning as indicated above in formula I and, in particular, $R^2$ or $R^3$ can form a 5- or 6-member ring with $R^4$ or $R^5$ as a whole.

Compounds of formula II which are suitable in the invention include in particular the following:

| $R^1$ | $R^2$ | $R^3$ | $R^4$ | $R^5$ |
|---|---|---|---|---|
| H | H | H | H | H |
| H | $CH_3$ | H | H | H |
| H | H | $CH_3$ | H | H |
| H | H | H | $CH_3$ | H |
| H | H | H | H | $CH_3$ |
| H | $CH_3$ | $CH_3$ | H | H |
| H | $CH_3$ | H | $CH_3$ | H |
| H | $CH_3$ | H | H | $CH_3$ |
| H | H | $CH_3$ | $CH_3$ | H |
| H | H | $CH_3$ | H | $CH_3$ |
| H | H | H | $CH_3$ | $CH_3$ |
| H | $CH_3$ | $CH_3$ | $CH_3$ | H |
| H | $CH_3$ | H | $CH_3$ | $CH_3$ |
| H | H | $CH_3$ | $CH_3$ | $CH_3$ |
| H | $CH_3$ | $CH_3$ | $CH_3$ | $CH_3$ |
| H | $C_2H_5$ | H | H | H |
| H | H | $C_2H_5$ | H | H |
| H | H | H | $C_2H_5$ | H |
| H | H | H | H | $C_2H_5$ |
| H | n-$C_3H_7$ | H | H | H |
| H | H | n-$C_3H_7$ | H | H |
| H | H | H | n-$C_3H_7$ | H |

| R¹ | R² | R³ | R⁴ | R⁵ |
|---|---|---|---|---|
| H | H | H | H | n-C₃H₇ |
| H | i-C₃H₇ | H | H | H |
| H | H | i-C₃H₇ | H | H |
| H | H | H | i-C₃H₇ | H |
| H | H | H | H | i-C₃H₇ |
| H | n-C₄H₉ | H | H | H |
| H | H | n-C₄H₉ | H | H |
| H | H | H | n-C₄H₉ | H |
| H | H | H | H | n-C₄H₉ |
| H | n-C₅H₁₁ | H | H | H |
| H | H | n-C₅H₁₁ | H | H |
| H | H | H | n-C₅H₁₁ | H |
| H | H | H | H | n-C₅H₁₁ |
| H | n-C₆H₁₃ | H | H | H |
| H | H | n-C₆H₁₃ | H | H |
| H | H | H | n-C₆H₁₃ | H |
| H | H | H | H | n-C₆H₁₃ |
| H | n-C₇H₁₅ | H | H | H |
| H | H | n-C₇H₁₅ | H | H |
| H | H | H | n-C₇H₁₅ | H |
| H | H | H | H | n-C₇H₁₅ |
| H | i-C₄H₉ | H | H | H |
| H | H | i-C₄H₉ | H | H |
| H | H | H | i-C₄H₉ | H |
| H | H | H | H | i-C₄H₉ |
| H | Isopentyl | H | H | H |
| H | H | Isopentyl | H | H |
| H | H | H | Isopentyl | H |
| H | H | H | H | Isopentyl |
| H | tert-C₄H₉ | H | H | H |
| H | H | tert-C₄H₉ | H | H |
| H | H | H | tert-C₄H₉ | H |
| H | H | H | H | tert-C₄H₉ |
| H | Neopentyl | H | H | H |
| H | H | Neopentyl | H | H |
| H | H | H | Neopentyl | H |
| H | H | H | H | Neopentyl |
| H | Neohexyl | H | H | H |
| H | H | Neohexyl | H | H |
| H | H | H | Neohexyl | H |
| H | H | H | H | Neohexyl |
| CH | H | H | H | H |
| CH₃ | CH₃ | H | H | H |
| CH₃ | H | CH₃ | H | H |
| CH₃ | H | H | CH₃ | H |
| CH₃ | H | H | H | CH₃ |
| CH₃ | CH₃ | CH₃ | H | H |
| CH₃ | CH₃ | H | CH₃ | H |
| CH₃ | CH₃ | H | H | CH₃ |
| CH₃ | H | CH₃ | CH₃ | H |
| CH₃ | H | CH₃ | H | CH₃ |
| CH₃ | H | H | CH₃ | CH₃ |
| CH₃ | CH₃ | CH₃ | CH₃ | H |
| CH₃ | CH₃ | H | CH₃ | CH₃ |
| CH₃ | H | CH₃ | CH₃ | CH₃ |
| CH₃ | CH₃ | CH₃ | CH₃ | CH₃ |
| CH₃ | C₂H₅ | H | H | H |
| CH₃ | H | C₂H₅ | H | H |
| CH₃ | H | H | C₂H₅ | H |
| CH₃ | H | H | H | C₂H₅ |
| CH₃ | n-C₃H₇ | H | H | H |
| CH₃ | H | n-C₃H₇ | H | H |
| CH₃ | H | H | n-C₃H₇ | H |
| CH₃ | H | H | H | n-C₃H₇ |
| CH₃ | i-C₃H₇ | H | H | H |
| CH₃ | H | i-C₃H₇ | H | H |
| CH₃ | H | H | i-C₃H₇ | H |
| CH₃ | H | H | H | i-C₃H₇ |
| CH₃ | n-C₄H₉ | H | H | H |
| CH₃ | H | n-C₄H₉ | H | H |
| CH₃ | H | H | n-C₄H₉ | H |
| CH₃ | H | H | H | n-C₄H₉ |
| CH₃ | n-C₅H₁₁ | H | H | H |
| CH₃ | H | n-C₅H₁₁ | H | H |
| CH₃ | H | H | n-C₅H₁₁ | H |
| CH₃ | H | H | H | n-C₅H₁₁ |
| CH₃ | n-C₆H₁₃ | H | H | H |
| CH₃ | H | n-C₆H₁₃ | H | H |
| CH₃ | H | H | n-C₆H₁₃ | H |
| CH₃ | H | H | H | n-C₆H₁₃ |
| CH₃ | n-C₇H₁₅ | H | H | H |
| CH₃ | H | n-C₇H₁₅ | H | H |
| CH₃ | H | H | n-C₇H₁₅ | H |
| CH₃ | H | H | H | n-C₇H₁₅ |
| CH₃ | i-C₄H₉ | H | H | H |
| CH₃ | H | i-C₄H₉ | H | H |
| CH₃ | H | H | i-C₄H₉ | H |
| CH₃ | H | H | H | i-C₄H₉ |
| CH₃ | Isopentyl | H | H | H |
| CH₃ | H | Isopentyl | H | H |
| CH₃ | H | H | Isopentyl | H |
| CH₃ | H | H | H | Isopentyl |
| CH₃ | tert-C₄H₉ | H | H | H |
| CH₃ | H | tert-C₄H₉ | H | H |
| CH₃ | H | H | tert-C₄H₉ | H |
| CH₃ | H | H | H | tert-C₄H₉ |
| CH₃ | Neopentyl | H | H | H |
| CH₃ | H | Neopentyl | H | H |
| CH₃ | H | H | Neopentyl | H |
| CH₃ | H | H | H | Neopentyl |
| CH₃ | Neohexyl | H | H | H |
| CH₃ | H | Neohexyl | H | H |
| CH₃ | H | H | Neohexyl | H |
| CH₃ | H | H | H | Neohexyl |

Preferred α-methylene-γ-butyrolactones include, among others:
α-methylene-γ-butyrolactone,
α-methylene-β-methyl-γ-butyrolactone,
α-methylene-β-ethyl-γ-butyrolactone,
α-methylene-β-propyl-γ-butyrolactone,
α-methylene-β-isopropyl-γ-butyrolactone,
α-methylene-β-butyl-γ-butyrolactone,
α-methylene-β-isobutyl-γ-butyrolactone,
α-methylene-β-tert-butyl-γ-butyrolactone,
α-methylene-β-n-pentyl-γ-butyrolactone,
α-methylene-β-isopentyl-γ-butyrolactone,
α-methylene-β-neopentyl-γ-butyrolactone,
α-methylene-β-n-hexyl-γ-butyrolactone,
α-methylene-β-n-heptyl-γ-butyrolactone,
α-methylene-γ-methyl-γ-butyrolactone,
α-methylene-γ-ethyl-γ-butyrolactone,
α-methylene-γ-propyl-γ-butyrolactone,
α-methylene-γ-isopropyl-γ-butyrolactone,
α-methylene-γ-n-butyl-γ-butyrolactone,
α-methylene-γ-iosbutyl-γ-butyrolactone,
α-methylene-γ-tert-butyl-γ-butyrolactone,
α-methylene-γ-n-pentyl-γ-butyrolactone,
α-methylene-γ-isopentyl-γ-butyrolactone,
α-methylene-γ-neopentyl-γ-butyrolactone,
α-methylene-γ-n-hexyl-γ-butyrolactone,
α-methylene-γ-n-heptyl-γ-butyrolactone,
α-methylene-β,β-dimethyl-γ-butyrolactone,
α-methylene-γ,γ-dimethyl-γ-butyrolactone,
α-methylene-β-methyl-γ-methyl-γ-butyrolactone, and
α-methylene-β-methyl-γ,γ-dimethyl-γ-butyrolactone.

Other preferred compounds of formula II include α-ethylidene-γ-butyrolactone and 4-methylene-2-oxa-bicyclo-[3.3.0]-octan-3-one (MOBCO).

Even more preferred compounds of formula II are the α-methylene-β-substituted-γ-butyrolactones and, among them, once again, α-methylene-β-methyl-γ-butyrolactone ($R^1=R^2=R^3=H$, $R^4=CH_3$, $R^5=H$ or $R^1=R^2=R^3=H$ and $R^4=H$ and $R^5=CH_3$), which are characterized in that the $R^4$ and/or $R^5$ groups are $C_1-C_7$ alkyl. On the other hand, of the $C_1-C_7$ groups, in particular methyl, ethyl, n-propyl, i-propyl, n-butyl, iso-butyl, tert-butyl, n-pentyl, neo-pentyl, n-hexyl or n-heptyl are useful for the invention. It is advantageous thereby if only one of the $R^4$ or $R^5$ groups is correspondingly substituted whereas the other is preferably H.

Finally, the best results are obtained if the $R^2$ and/or $R^3$ groups in γ-position of the β-substituted γ-butyrolactone are H, methyl or ethyl.

Accordingly, the following compounds are especially favorable:

α-methylene-β-methyl-γ-butyrolactone,,
α-methylene-β-ethyl-γ-butyrolactone,
α-methylene-β-n-butyl-γ-butyrolactone,
α-methylene-β-methyl-γ-methyl-γ-butyrolactone
or
α-methylene-β-methyl-γ,γ-dimethyl-γ-butyrolactone and, among them, once again, α-methylene-β-methyl-γ-butyrolactone ($R^1=R^2=R^3=H$, $R^4=CH_3$, $R^5=H$ or $R^1=R^2=R^3=H$ and $R^4=H$ and $R^5=CH_3$).

Furthermore, 4-methylene-2-oxa-bicyclo-[3.3.0]-octan-3-one is quite particularly advantageous as a compound of general formula II.

The above-named compounds of general formula II are either commercially obtainable or are synthesized in accordance with conventional methods known in the art. For instance, methods for preparing α-methylene-γ-butyrolactones are described in:

1) EP 295 553 B1; Method of Producing 1,1-Disubstituted Ethylene Compounds.
2) A Method for the Synthesis of Unsaturated Carbonyl Compounds; G. M. Ksander, J. E. McMurry, M. Johnson; J. Org. Chem. vol. 42, No. 7, 1180–1185, (1977).
3) Methods for the Synthesis of α-Methylene Lactones; P. A. Grieco; Synthesis, February 1975, pp. 67–82 (review).
4) Synthesis of α-Methylene-γ-Butyrolactones by Rearrangement of Functionally Substituted Cyclopropanes; P. F. Hydrlik, L. R. Rudnick, S. H. Korzeniowski; J. Am. Chem. Soc. 95 (20), pp. 6848–6850 (1973).
5) An Efficient Synthesis of γ-Methylene-γ-Butyrolactone; R. A. Amos, J. A. Katzenellenbogen; J. Org. Chem. 43, No. 4, pp. 560–564 (1978).
6) A New General Route to the Synthesis of Fused α-Methylene Lactones; P. A. Grieco, M. Miyashita; J. Org. Chem. vol. 39, No. 1, pp. 120–122 (1974).
7) M. K. Akkapeddi, Macromolecules 12, p. 546 (1979).
8) J. C. Sarma, R. P. Sharma, Heterocycles vol. 24, p. 441 (1986).
9) R. B. Gammill, C. A. Wilson, T. A. Bryson, Synth. Commun. vol. 5, p. 245 (1975).

According to the invention even γ-methylene-γ-butyrolactones of general formula III can be used as preferable component A) compounds:

$$\begin{array}{c} H_2C \\ \diagdown \\ C-C-C-C=O \\ | \quad | \quad | \\ \quad R^5 \quad R^3 \\ O \rule{2cm}{0.4pt} \end{array} \quad \begin{array}{c} R^4 \quad R^2 \\ | \quad | \end{array} \quad (III)$$

in which
$R^2$, $R^3$, $R^4$ and $R^5$ have the same meanings as indicated above for formula I.

The formation of a 5- or 6-member ring system can also take place between the groups $R^2$ or $R^3$ and $R^4$ or $R^5$, that is, between α-substituents and β-substituents, in the exo-methylene lactones of formula III.

Preferred γ-methylene-γ-butyrolactone compounds include, among others:
γ-methylene-γ-butyrolactone,
γ-methylene-α-methyl-γ-butyrolactone,
γ-methylene-α,α-dimethyl-γ-butyrolactone,
γ-methylene-β-methyl-γ-butyrolactone,
γ-methylene-β,β-dimethyl-γ-butyrolactone,
γ-methylene-α-ethyl-γ-butyrolactone,
γ-methylene-α-propyl-γ-butyrolactone,
γ-methylene-α-isopropyl-γ-butyrolactone,
γ-methylene-α-butyl-γ-butyrolactone (n-, iso-, tert.-),
γ-methylene-α-pentyl-γ-butyrolactone (n-, iso-, tert.-),
γ-methylene-α-hexyl-γ-butyrolactone (n-, iso-, tert.-),
γ-methylene-β-ethyl-γ-butyrolactone,
γ-methylene-β-propyl-γ-butyrolactone,
γ-methylene-β-isopropyl-γ-butyrolactone,
γ-methylene-β-butyl-γ-butyrolactone (n-, iso-, tert.-),
γ-methylene-β-pentyl-γ-butyrolactone (n-, iso-, tert.-),
γ-methylene-β-hexyl-γ-butyrolactone (n-, iso-, tert.-),
γ-methylene-α,β-dimethyl-γ-butyrolactone, and
γ-methylene-α,β-diethyl-γ-butyrolactone.

The γ-methylene butyrolactones of general formula III are not commercially available. However, they are produced in accordance with conventional methods known in the art. For instance, a survey is presented in "Synthesis of 4-Penten-4-Olides (γ-Methylene-γ-Butyrolactones) via pentenic acids", by H. J. Günther, E. Guntrum, V. Jäger, Liebigs Ann. Chem. 1984, pp. 15–30. Instructions for the production of individual representatives are found in "Synthesis of γ-Methylene Butyrolactones (4-Penten-4-Olides)", V. J ager and H. J. Guntrum, Tetrahedron Letters, No. 29, pp. 2543–2546 (1977). As persons skilled in this art would appreciate, other compounds can be analogously obtained without undue experimentation.

α-Methylene-δ-valerolactones of general formula IV $$\begin{array}{c} R^2 \quad R^4 \quad R^6 \quad CH_2 \\ | \quad | \quad | \quad \| \\ R^3-C-C-C-C-C=O \\ | \quad | \quad | \\ \quad R^5 \quad R^7 \\ O \rule{3cm}{0.4pt} \end{array} \quad (IV)$$

are also suitable as preferred compounds of component A), in which
$R^2$–$R^7$ have the same meanings as indicated above for formula I.

Suitable α-methylene-δ-valerolactones include, among others, the following compounds:
α-methylene-δ-valerolactone,
α-methylene-β-methyl-δ-valerolactone,
α-methylene-β-ethyl-δ-valerolactone,
α-methylene-β-isopropyl-δ-valerolactone,
α-methylene-β-butyl-δ-valerolactone (n-; iso-; tert.-),
α-methylene-β-pentyl-δ-valerolactone (n-; iso-; tert.-),
α-methylene-β-hexyl-δ-valerolactone (n-; iso-; tert.-),
α-methylene-β-heptyl-δ-valerolactone (n-; iso-; tert.-),
α-methylene-γ-methyl-δ-valerolactone,
α-methylene-γ-ethyl-δ-valerolactone,
α-methylene-γ-propyl-δ-valerolactone,
α-methylene-γ-isopropyl-δ-valerolactone,
α-methylene-γ-butyl-δ-valerolactone (n-; iso-; tert.-),
α-methylene-γ-pentyl-δ-valerolactone (n-; iso-; tert.-),
α-methylene-γ-hexyl-δ-valerolactone (n-; iso-; tert.-),
α-methylene-γ-heptyl-δ-valerolactone (n-; iso-; tert.-), and
α-methylene-β-methyl-δ,δ-dimethyl-δ-valerolactone.

Even in the case of the α-methylene-δ-valerolactones the formation of a 5- or 6-member ring can take place between two $R^2$ to $R^7$ groups not connected to the same C atom, which ring can itself be substituted.

The compounds of formula IV are produced according to conventional methods known in the art or by analogy to such conventional methods. Examples of methods for the production of α-methylene-δ-valerolactones are described in:

1) Regiospecific Synthesis of α-methylene Ketals and -Ketones, F. Huet, M. Pellet and J. M. Conia; Tetrahedron Letters, No. 39, pp. 3505–3508, 1977.
2) A method for the Synthesis of Unsaturated Carbonyl Compounds; G. M. Ksander, J. E. McMurry, M. Johnson; J. Org. Chem. vol. 42, No. 7, 1180–1185 (1977).
3) Methods for the Synthesis of α-Methylene Lactones, P. A. Grieco; Synthesis, February 1975, pp. 67–82 (review).
4) Synthesis of α-Methylene-δ-Lactones; H. Marschall, F. Vogel, P. Weyerstahl; Chem. Ber. 107, pp. 2852–2859 (1974).

In principle, a 5- or 6-member ring can form between two $R^2$ to $R^7$ groups in the compounds of formula IV described above. The two groups participating in the ring formation preferably differ from one another in their relative position to the carbonyl group of the lactone ring in such a manner that their position is adjacent. That is, the $R^2$ or $R^3$ groups preferably form a ring with $R^6$ or $R^7$ whereas the ring formation between $R^2$ or $R^3$ and $R^4$ or $R^5$ is not as preferred. The formation of a ring between two α-, β- or γ-groups is likewise not preferred.

In general, regarding possible ring or bridge formations between two of the groups $R^2$ to $R^7$ in accordance with formulas I to IV, the designations, as they are used for clarifying the structures possible for the individual R groups, are to be modified for the case of a ring or bridge formation in accordance with the rules of chemical nomenclature. Thus, it is understood that in the case of a bridge formation between two alkyl groups in α- and γ-position of the lactone ring an alkylene group results.

Of the compounds represented by formulas I to IV, various components A) and B) can be reacted for obtaining a copolymer within the framework of the invention. However, compounds of the invention preferably comprise copolymers of lactones of formulas I to IV which contain at least one vinylically unsaturated monomer.

In this invention, the vinylically unsaturated monomers of component B) include in particular the esters of acrylic acid and methacrylic acid with monovalent alcohols, especially those with 1–16 carbon atoms (such as methacrylic acid methyl esters, methacrylic acid ethyl ester, methacrylic acid-n-butyl ester, methacrylic acid isobutyl ester, methacrylic acid-2-ethylhexyl ester, methacrylic acid lauryl ester, methacrylic acid aryl ester, methacrylic acid stearyl ester, acrylic acid methyl ester, acrylic acid ethyl ester, acrylic acid n-butyl ester, acrylic acid t-butyl ester, acrylic acid-2-ethylhexyl ester, acrylic acid lauryl ester and vinyl aromatic compounds including styrene, vinyl toluene, p-tert.-butyl styrene or α-methyl styrene).

Monomers with a further functional group such as α-β-unsaturated mono- or dicarboxylic acids (for example, acrylic acid, methacrylic acid or itaconic acid, esters of acrylic acid or methacrylic acid with bivalent alcohols, such as hydroxyethylacrylate, hydroxypropylacrylate or hydroxypropylmethacrylate, acrylamide or methacrylamide, dimethylaminoethylacrylate or dimethylaminoethylmethacrylate) are also suitable components of monomer mixtures. Further suitable components of monomer mixtures include glycidylacrylate or glycidylmethacrylate. As persons skilled in this art would be aware, the invention contemplates all monomers which are copolymerizable with exo-methylene-γ-butyrolactones and/or exo-methylene-δ-valerolactones, and which can be processed to form materials, preferably using chemical molding methods.

Especially preferred monomers include those whose homopolymers can be processed to transparent, glassy plastics. These include, in addition to styrene, acrylates and methacrylates of general formula V

wherein
$R^1$ is $C_1$–$C_6$-alkyl (preferably $C_1$–$C_4$-alkyl) and
$R^2$ is H or $CH_3$.

Exemplary compounds include, among others, methylacrylate, ethylacrylate, propylacrylate, n-butylacrylate, methylmethacrylate, propylmethacrylate, and n-butylmethacrylate.

Methylmethacrylate and n-butylmethacrylate as well as methylacrylate, ethylacrylate and n-butylacrylate are preferred within the framework of the invention. In addition to styrene, methylmethacrylate (MMA) is particularly preferred.

Although basically all the lactones falling under formulas I to IV are suitable for the copolymerization with acrylates and/or methacrylates, α-methylene-γ-butyrolactones with aliphatic groups in β and/or γ position and α-methylene-δ-valerolactones with aliphatic groups in β and/or γ and/or δ position as well as the unsubstituted parent substances of the α-methylene lactones cited are especially suitable. The copolymers of (meth-)acrylates with α-methylene butyrolactones are preferred because they exhibit better thermal resistance over the copolymers of (meth-)acrylates with α-methylene valerolactones.

Copolymers of α-methylene-γ-butyrolactones with substituents in β position have unexpectedly high glass transition temperatures. The glass transition temperatures of the homo- and copolymers decrease with the length of the side chain in the lactone ring. The copolymer of MMA with α-methylene-β-methyl-γ-butyrolactone is therefore especially thermally dimensionally stable and especially preferred within the framework of the invention. It was in particular surprising and not readily foreseeable in this connection that β-alkyl-substituted γ-butyrolactones assume a special position both in comparison to the non-cyclic analogues and also to the γ-substituted cyclic analogues.

Thus, during the transition from polymethylacrylate to polymethylmethacrylate, the glass transition temperature Tg rises from about 10° C. to about 105° C. In contrast, during the transition from α-methylene-γ-butyrolactone to α-methylene-β-methyl-γ-butyrolactone, the Tg rises from 188° C. to more than 340° C. The difference between γ-butyrolactone and acyclic analogues (MMA and MA) is greater by a factor of approximately 1.5, and is attributable to the introduction of a methyl group into the particular monomer in the case of the corresponding polymer.

Finally, the difference between the Tg of α-methylene-γ-methyl-γ-butyrolactone (Tg=229° C.) and the Tg of α-methylene-β-methyl-γ-butyrolactone (Tg>340° C.) is also unexpected.

α-Methylene-γ-butyrolactones and α-methylene-δ-valerolactones are especially suitable for copolymerization with further vinylic monomers, creating thermally dimensionally stable plastics. Thus, the copolymers of styrene with α-methylene butyrolactones are preferred because of their better thermal resistance over the copolymers of styrene with α-methylene valerolactones.

The copolymers of the invention exhibit improved thermal dimensional stability when compared to the corresponding homopolymers, even when using relatively small amounts of exo-methylene lactone comonomers.

Notably, a relatively high amount of exo-methylene lactone in the copolymer of the invention also results in improved thermal dimensional stability. In a preferred embodiment, the copolymers of the invention are therefore characterized by a content of exo-methylene lactone of formula I of 1–70% relative to the total weight of the copolymer. Furthermore, it is advantageous if the copolymers contain 5–50% by weight, and preferably 10–30% by weight, of exo-methylene lactone in accordance with one of formulas I to IV.

If the copolymer in accordance with the invention contains less than 1% by weight of an exo-methylene lactone compound of formulas I to V, the effect of the improvement in thermal dimensional stability is not significant. As contemplated by this invention, it is possible to exceed the upper limit of 70% by weight, but this is not preferred because of the generally greater expense of exo-methylene lactone.

As has already been explained above, copolymers of MMA and exo-methylene lactones of formulas I to IV are especially useful for the invention. According to the invention, therefore, a copolymer is also advantageous in which component B) is (1) methylmethacrylate, (2) the methylmethacrylate content is 50% by weight or greater, (3) the glass transition temperature is greater than 120° C., and (4) the copolymer is transparent and clear.

The polymerization to obtain the copolymers of exo-methylene lactones can be carried out according to various conventional methods of radical polymerization. Mass polymerization and suspension (bead) polymerization were intensively examined by the inventors in the context of the invention. For example, mass polymerization is described in Houben-Weyl, vol. E20, part 2 (1987), p. 1145 ff. Suspension polymerization is described in Houben-Weyl, vol. E20, part 2 (1987), p. 1149ff.

In addition to the composition of the copolymer, its molecular weight can also play a part in the later processing of the copolymers in order to produce thermally dimensionally stable formed materials. Thus, potential later processing variants can be achieved by deliberately adjusting the molecular weight.

Of course, it is possible to contrive such high molecular weights during the actual copolymerization process that adequate subsequent thermal forming becomes impossible. Thus, it is preferred to produce a low molecular weight copolymer which can be subsequently adequately formed as desired in further thermal methods.

If a processing of the comonomers of the invention in an extrusion or injection-molding method is desired, a rather low molecular weight ($\overline{M}_w$) between 50,000 and 250,000 (and even more advantageously between 80,000 and 200,000) is preferred for the copolymers of the invention. In principle, such copolymers can be brought into a thermoplastically processable melt by heating.

The molecular weight of the copolymers can be adjusted as desired by someone skilled in the art by using known chain transfer agents and, if necessary, limiting the requirements accordingly.

The copolymers of this invention can basically be adapted to any known shaping processes for producing formed materials with improved thermal dimensional stability.

For instance, copolymers of the invention can be processed in an advantageous manner to produce plastic molding materials in granulate form. These molding material granulates are then especially suitable for a further processing by extrusion or injection molding. The production of the molding material granulates takes place by extrusion and granulation of the plastics accumulated in plate or bead form, during which any accompanying low-molecular weight substances are separated from the polymers by degassing in the extruder. Such a method is described in the "Handbuch der Kunststoff-Extrusionstechnik", vol. I and II (editors: F. Heusen, W. Kappe, H. Potente; Hauser Verlag 1986 and 1989).

If the actual polymerization procedure produces a copolymer having too high a molecular weight, such that and subsequent thermal further processing becomes difficult, then the forming of the molded materials should take place during the polymerization procedure, preferably in a suitable mold. Along these lines, in a preferred embodiment of the invention the copolymer of the invention is processed to cast or rolled glass. The cast glass is not prepared from molding materials but rather by polymerizing a syrup comprising the components suitable for polymerization in a mold. The syrups can also comprise certain amounts of so-called prepolymers.

In another embodiment, the invention also relates to thermally dimensionally stable cast-glass bodies obtained according to a chamber kiln process by mass polymerization of a syrup comprising A) At least one exo-methylene lactone of general formula I

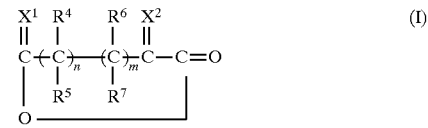

in which
n=0 or 1,
m=0 or 1 and the sum n+m is either 1 or 2;
$X^1$ and $X^2$ each stand for $=CH-R^1$ or two single-bonded substituents $R^2$ and $R^3$, and wherein only one of $X^1$ or $X^2$ is $=CH-R^1$, and where $X^1$ is $=CH-R^1$ the sum of n+m must be 1;
and wherein $R^1, R^2, R^3, R^4, R^5, R^6$ and $R^7$ can be the same or different, and can be H, $C_1-C_7$-alkyl and halogen, independently of each other,
and the $C_1-C_7$-alkyl groups can be branched or linear, N-, P-, or S-heteroatom-substituted, O-alkyl substituted, or can carry halogen substitution and/or carbonyl groups,
and wherein two of the groups $R^1$ to $R^7$ can be connected to a 5 or 6-member ring;
with
B) at least one vinylically unsaturated monomer or at least one exo-methylene lactone(s) of general formula I, where the exo-methylene lactone of component B) is different from the exo-methylene lactone(s) of component A).

In a preferred embodiment the cast-glass bodies of the invention are characterized by an average molecular weight ($M_w$) of the copolymer, consisting of components A) and B), of 500,000–5,000,000.

The invention is explained in more detail in the following with examples.

A list of the abbreviations for substances used in the examples and reference examples:

| Monomers: | |
|---|---|
| α-MγBL | α-methylene-γ-butyrolactone |
| γ-MγBL | γ-methylene-γ-butyrolactone |
| p60 -MβMγBL | α-methylene-β-methyl-γ-butyrolactone |
| α-MβEγBL | α-methylene-β-ethyl-γ-butyrolactone |
| α-MβBγBL | α-methylene-β-butyl-γ-butyrolactone |
| α-MβMγMγBL | α-methylene-β-methyl-γ-methyl-γ-butyrolactone |
| α-MββMγBL | α-metylene-ββ-dimethyl-γ-butyrolactone |

-continued

| | |
|---|---|
| α-MβMγγMγBL | α-methylene-β-methyl-γγ-dimethyl-γ-butyrolactone |
| α-MγMγBL | α-methylene-γ-methyl-γ-butyrolactone |
| α-MγBγBL | α-methylene-γ-butyl-γ-butyrolactone |
| α-MγHγBL | α-methylene-γ-heptyl-γ-butyrolactone |
| α-MγγMγBL | α-methylene-γ-dimethyl-γ-butyrolactone |
| α-MδVL | α-methylene-δ-valerolactone |
| α-MγγMδVL | α-methylene-γ-dimethyl-δ-valerolactone |
| α-MβMδδMδVL | α-methylene-β-methyl-δδ-dimethyl-δ-valerolactone |
| MOBCO | 4-methylene-2-oxabicyclo[3.3.0]octan-3-one |
| Chain transfer agents: | |
| TGEH | thioglycolic acid-2-ethylhexyl ester |
| t-DDM | tert.-dodecyl mercaptan thiol |
| GDMA | glycol dimercaptoacetate |
| Initiators: | |
| LPO | dilauryl peroxide |
| BPO | dibenzoyl peroxide |
| t-BPEH | tert.-butyl per-2-ethyl hexanoate |
| ADMV | 2,2'-azobis(2,4-dimethylvaleronitrile) |
| AIBN | 2,2'-azobis-(isobutyronitrile) |
| DTBP | di-tert.-butyl peroxide |

The polymerizability of exo-methylene lactones was tested in numerous examples of the invention and in reference examples. In most instances (examples 1–12, 14–44) the mass polymerization was carried out in accordance with the chamber process (see Houben-Weyl, vol, E20, part 2 (1987), p. 1145 ff). In further examples the polymerizability in solution (example 13) and the suspension (bead) polymerization (2a, 13b, 17a) were tested. To the extent not otherwise indicated, percents and parts always refer to percents by weight and parts by weight.

The properties such as glass transition temperature, weight loss (30 min at 300° C.) as well as the optical evaluation used to characterize the polymers in the following text examples and tables presenting summaries of the conditions for the homo- and copolymerization were determined by means of the following analytic methods:

Glass transition temperature:
Device: Mettler TA 3000
Process: Dynamic differential calorimetry
Method: Heat at a heating rate of 10° C./min from 0° C. up to the agreed-on final temperature
   Weight loss or thermal decomposition:
Device: Netzsch TG 209
Process: Thermogravimetry
Method: Heat a specimen within 30 min from room temperature to 300° C. and maintain 30 min further at 300° C.; determine weight loss
TG(A)=Weight loss during the heating to 300° C. (in percent relative to the original weight of the test specimen)
TG(B)=Weight loss after a further 30 min at 300° C. (in percent relative to the original weight of the test specimen)
   Optical evaluation:
   Visual evaluation with reference specimen of known Haze value:
* transparent=Haze<2
* opaque=Haze>2
   Refraction index: according to DIN 53 491
   Vicat temperature: according to DIN 53 460
   Elastic modulus: according to DIN 53 457
   Tensile strength: according to DIN 53 455
   Ball-puncture resistance: according to DIN ISO 2039

T1
   Impact strength: according to DIN 53 453

α-methylene-γ-butyl-γ-butyrolactone (α-MγBγBL)

REFERENCE EXAMPLE 1

A solution of 1000 parts α-MγBγBL, 2.5 parts thioglycolic acid-2-ethylhexyl ester (TGEH), 1.5 parts t-dodecyl mercaptan [thiol], 2.5 parts dilauroyl peroxide and 0.3 parts ditertiary butyl peroxide was polymerized according to the chamber process between glass plates 4 hours at 60° C., 1 hour at 90° C. and one hour at 140° C.

The resulting polymer has the following characteristic data:

| | |
|---|---|
| Thermal decomposition (30 min, 300° C.) | 2.6% |
| Glass transition temperature | 146° C. |
| Average molar weight | 180000 g/mole |
| Refraction index (20° C.) | 1,500 |
| Density | 1.126 g/ccm |

EXAMPLE 2

A solution of 500 parts α-MγBγBL, 500 parts methylmethacrylate and 1 part t-butyl per-2-ethyl hexanoate was polymerized according to the chamber method between glass plates 8 hours at 80° C.

The resulting polymer has a glass transition temperature of 120° C.

EXAMPLE 2a

A solution of 400 parts α-MγBγBL, 600 parts methylmethacrylate, 3.5 parts thioglycolic acid-2-ethylhexyl ester, 1.5 parts t-dodecyl mercaptan, 0.5 parts stearic acid and 2.5 parts dilauroyl peroxide was suspended in 2000 parts water and 2.6 parts Degapas® 8105 S and polymerized after the suspension method for 2 hours at 80° C. and one hour at 94° C.

EXAMPLE 3

A solution of 850 parts α-MγBγBL, 150 parts n-butylmethacrylate and 1 part t-butyl per-2-ethyl hexanoate was polymerized according to the chamber method between glass plates 4.5 hours at 80° C.

The resulting polymer has a glass transition temperature of 110° C.

α-methylene-γ-methyl-γ-butyrolactone (α-MγMγBL)

REFERENCE EXAMPLE 4

A solution of 1000 parts α-MγMγBL and 1 part t-butyl per-2-ethylhexanoate was polymerized according to the chamber method between glass plates 9.5 hours at 80° C.

The resulting polymer has a glass transition temperature of 229° C. and 3.5% weight loss after 30 min at 300° C.

EXAMPLE 5

A solution of 500 parts α-MγMγBL, 500 parts methylmethacrylate and 1 part t-butyl per-2-ethylhexanoate was polymerized according to the chamber method between glass plates 5 hours at 90° C.

The resulting polymer has a glass transition temperature of 167° C. and a weight loss of 4.4% after 30 min at 300° C.

EXAMPLE 6

A solution of 850 parts α-MγMγBL, 150 parts n-butyl acrylate and 1 part t-butyl per-2-ethylhexanoate was polymerized according to the chamber method between glass plates 4 hours at 80° C.

The resulting polymer has a glass transition temperature of 211° C.

EXAMPLE 7

A solution of 850 parts α-MγMγBL, 150 parts n-butylmethacrylate and 1 part t-butyl per-2-ethylhexanoate was polymerized according to the chamber method between glass plates 5 hours at 80° C.

The resulting polymer has a glass transition temperature of 200° C.

EXAMPLE 8

A solution of 500 parts α-MγMγBL, 500 parts styrene and 1 part dilauroly peroxide was polymerized according to the chamber method between glass plates 6 hours at 70° C.

The resulting polymer has a glass transition temperature of 160° C.

α-methylene-γ-heptyl-γ-butyrolactone (α-MγHγBL)

REFERENCE EXAMPLE 9

A solution of 1000 parts α-MγHγBL and 6 parts 2,2'-azobis(2,4-dimethylvaleronitrile) was polymerized according to the chamber method between glass plates 3.5 hours at 90° C.

The resulting polymer has a glass transition temperature of 105° C.

EXAMPLE 10

A solution of 700 parts α-MγHγBL, 300 parts α-MγBL, 2.9 parts glycol dimercaptoacetate and 3 parts 2,2-azobis(2,4-dimethylvaleronitrile) was polymerized according to the chamber method between glass plates 3 hours at 100° C.

The resulting polymer has a glass transition temperature of 126° C.

α-methylene-γ-butyrolactone (α-MγBL)

REFERENCE EXAMPLE 11

A solution of 1000 parts α-MγBL, 3 parts thioglycolic acid-2-ethylhexyl ester and 0.8 part t-butyl per-2-ethylhexanoate was polymerized according to the chamber method between glass plates one hour at 70° C. and 2 hours at 120° C.

The resulting polymer has the following characteristic data:

| | |
|---|---|
| Glass transition temperature | 188° C. |
| Vicat | 182° C. |
| Elastic modulus | 6600 N/mm$^2$ |
| Ball-puncture resistance | 490 N/mm$^2$ |
| TG(B) | 0.4% |
| Reafraction index | 1.540 |

REFERENCE EXAMPLE 12

A solution of 650 parts α-MγBL, 350 parts styrene, 3 parts thioglycolic acid-2-ethylhexyl ester and 1.8 parts t-butyl per-2-ethylhexanoate was polymerized according to the chamber method between glass plates 3 hours at 70° C. and 2 hours at 150° C.

The resulting polymer has the following characteristic data:

| | |
|---|---|
| Glass transition temperature | 166° C. |
| Vicat | 152° C. |
| Elastic modulus | 4100 N/mm$^2$ |
| Ball-puncture resistance | 320 N/mm$^2$ |
| TG(B) | 1.8% |

REFERENCE EXAMPLE 13

A solution of 500 parts α-MBL, 500 parts methylmethacrylate, 2 parts thioglycolic acid-2-ethylhexyl ester and one part 1,1'azobis(cyanocyclohexane) was dosed for 3 hours into 600 parts dimethylformamide, subsequently heated one hour at 85° C. and maintained one hour at 115° C.

The resulting polymer has a glass transition temperature of 135° C.

REFERENCE EXAMPLE 13a

A solution of 800 parts α-MγBL, 200 parts methylmethacrylate, 3 parts thioglycolic acid-2-ethylhexyl ester and 0.8 part t-butyl per-2-ethylhexanoate was polymerized according to the chamber method 1 hour at 70° C. and 2 hours at 120° C.

The resulting polymer has the following characteristic data:

| | |
|---|---|
| Vicat | 162° C. |
| Elastic modulus | 6000 N/mm$^2$ |
| Ball thrust | 421 N/mm$^2$ |
| TG(B) | 1.0% |
| Refraction index | 1.532 |

REFERENCE EXAMPLE 13b

A solution of 200 parts α-MγBL, 800 parts methylmethacrylate, 3.5 parts thioglycolic acid-2-ethylhexyl ester and 0.5 part 2,2'azobis(isobutyronitrile) was polymerized according to the chamber method 3.5 hours at 75° C. and 3 hours at 120° C.

The resulting polymer has the following characteristic data:

| | |
|---|---|
| Vicat | 118° C. |
| Impact strength | 15.6 kJ/m$^2$ |
| TG(B) | 10.8% |
| Glass transition temperature | 133° C. |

REFERENCE EXAMPLE 14

A solution of 500 parts α-MγBL, 500 parts α-MγBγBL, 2.9 parts glycol dimercaptoacetate and 0.3 parts 2,2'-azobis(2,4-dimethylvaleronitrile) was polymerized according to the chamber method between glass plates 40 min at 100° C. and 2.5 hours at 130° C.

The resulting polymer has a glass transition temperature of 172° C.

γ-methylene-γ-butyrolactone (γ-MγBL)

REFERENCE EXAMPLE 15

A solution of 1000 parts γ-MγBL and 20 parts 2,2'-azobis(isobutyronitrile) was polymerized according to the chamber method between glass plates 14 hours at 80° C.

The resulting polymer has a glass transition temperature of 165° C. and a weight loss of 9.3% after 30 min at 300° C.

α-methylene-β-methyl-γ-butyrolactone
(α-MβMγBL)

REFERENCE EXAMPLE 16

A solution of 1000 parts α-MβMγBL and 1 part t-butyl per-2-ethyl hexonate was polymerized according to the chamber method between glass plates 5 hours at 80° C.

The resulting polymer has no glass transition, decomposition commences at 300° C. and it has a weight loss of 3.5% after 30 min at 300° C.

EXAMPLE 17

A solution of 200 parts α-MβMγBL, 800 parts methylmethacrylate, 2.5 parts thioglycolic acid-2-ethylhexyl ester, 2 parts t-dodecyl mercaptan, 2 parts 2,2'azobis(isobutyronitrile) and 0.3 part ditertiary butylperoxide was polymerized according to the chamber method between glass plates 3 hours at 80° C., one hour at 90° C. and one hour at 140° C.

The resulting polymer has the following characteristic data:

| | |
|---|---|
| Glass transition temperature | 159° C. |
| Vicat | 141° C. |
| Elastic modulus (DMTA) | 3700 N/mm$^2$ |
| Ball-puncture resistance | 213 N/mm$^2$ |
| TG(B) | 9.8% |
| Refraction index | 1.497% |

EXAMPLE 17a

A solution of 200 parts α-MβMγBL, 800 parts methylmethacrylate, 3.5 parts thioglycolic acid-2-ethylhexyl ester, 1.5 parts t-dodecyl mercaptan, 0.5 part stearic acid and 10 parts dilauroyl peroxide was suspended in 2000 parts water and 1.2 parts Dicktol 60/7 and polymerized according to the suspension method for 2 hours at 80° C. and one hour at 94° C.

EXAMPLE 18

A solution of 500 parts α-MβMγBL, 500 parts n-butylmethacrylate and 1 part 2,2'azobis(isobutyronitrile) was polymerized according to the chamber method between glass plates 7 hours at 80° C.

The resulting polymer has a glass transition temperature of 186° C.

α-methylene-β-butyl-γ-butyrolactone (α-MβBγBL)

REFERENCE EXAMPLE 19

A solution of 1000 parts α-MβBγBL and 10 parts 2,2'-azobis(isobutyronitrile) was polymerized according to the chamber method between glass plates 3 hours at 80° C.

The resulting polymer has a glass transition temperature of 220° C. and a weight loss of 24.0% after 30 min at 300° C.

EXAMPLE 20

A solution of 500 parts α-MβBγBL, 500 parts methylmethacrylate and 5 parts 2,2'-azobis(isobutyronitrile) was polymerized according to the chamber method between glass plates 3 hours at 80° C.

The resulting polymer has a glass transition temperature of 162° C. and a weight loss of 30.5% after 30 min at 300° C.

EXAMPLE 21

A solution of 500 parts α-MβBγBL, 500 parts styrene and 3 parts 2,2'-azobis(isobutyronitrile) was polymerized according to the chamber method between glass plates 12 hours at 80° C.

The resulting polymer has a glass transition temperature of 150° C.

α-methylene-β-dimethyl-γ-butyrolactone
(α-MββMγBL)

EXAMPLE 22

A solution of 500 parts α-MββMγBL, 500 parts styrene and 5 parts dibenzoyl peroxide was polymerized according to the chamber method between glass plates 7 hours at 85° C. and one hour at 95° C.

The resulting polymer has a glass transition temperature of 160° C.

α-methylene-γ-dimethyl-γ-butyrolactone
(α-MγγMγBL)

REFERENCE EXAMPLE 23

A solution of 1000 parts α-MγγMγBL, and 6 parts 2,2'-azobis(isobutyronitrile) was polymerized according to the chamber method between glass plates 6 hours at 80° C.

The resulting polymer has a glass transition temperature of 211° C. and 12.1 weight loss after 30 min at 300° C.

EXAMPLE 24

A solution of 500 parts α-MγγMγBL, 500 parts methylmethacrylate, 2.5 parts thioglycolic acid-2-ethylhexyl ester, 1.5 parts t-dodecyl mercaptan and 6 parts 2,2'azobis(isobutyronitrile) was polymerized according to the chamber method between glass plates 6 hours at 80° C.

The resulting polymer has a glass transition temperature of 160° C. and 11.1% weight loss after 30 min at 300° C.

EXAMPLE 25

A solution of 500 parts α-MγγMγBL, 500 parts styrene, 2.5 parts thioglycolic acid-2-ethylhexyl ester, 1.5 parts t-dodecyl mercaptan and 10 parts 2,2'azobis (isobutyronitrile) was polymerized according to the chamber method between glass plates 7 hours at 80° C.

The resulting polymer has a glass transition temperature of 155° C.

α-methylene-β-methyl-γ-dimethyl-γ-butyrolactone
(α-MβMγγMγBL)

REFERENCE EXAMPLE 26

A solution of 1000 parts α-MβMγγMγBL, 2.5 parts thioglycolic acid-2-ethylhexyl ester, 1.5 parts t-dodecyl mercaptan and 10 parts 2,2'azobis(isobutyronitrile) was polymerized according to the chamber method between glass plates 14 hours at 80° C.

The resulting polymer has no unambiguous glass transition temperature.

EXAMPLE 27

A solution of 500 parts α-MβMγγMγBL, 500 parts methylmethacrylate, 2.5 parts thioglycolic acid-2-ethylhexyl ester, 1.5 parts t-dodecyl mercaptan and 20 parts dibenzoyl peroxide was polymerized according to the chamber method between glass plates 14 hours at 80° C.

The resulting polymer has a glass transition temperature of 177° C.

EXAMPLE 28

A solution of 500 parts α-MβMγγMγBL, 500 parts styrene, 2.5 parts thioglycolic acid-2-ethylhexyl ester, 1.5 parts t-dodecyl mercaptan and 20 parts dibenzoyl peroxide was polymerized according to the chamber method between glass plates 14 hours at 80° C.

The resulting polymer has a glass transition temperature of 185° C.

4-methylene-2-oxabicyclo-[3.3.0]octan-3-one (MOBCO)

REFERENCE EXAMPLE 29

A solution of 1000 parts MOBCO and 10 parts dibenzoyl peroxide was polymerized according to the chamber method between glass plates 8 hours at 80° C.

The resulting polymer has a glass transition temperature of 200° C. and a weight loss of 7.2% after 30 min at 300° C.

EXAMPLE 30

A solution of 500 parts MOBCO, 500 parts methylmethacrylate and 7 parts 2,2'azobis(isobutyronitrile) was polymerized according to the chamber method between glass plates 5 hours at 80° C. and 12 hours at 90° C.

The resulting polymer has a glass transition temperature of 149° C. and a weight loss of 16.2% after 30 min at 300° C.

EXAMPLE 31

A solution of 500 parts MOBCO, 500 parts styrene, 2.5 parts thioglycolic acid-2-ethylhexyl ester, 1.5 parts t-dodecyl mercaptan and 20 parts dibenzoyl peroxide was polymerized according to the chamber method between glass plates 14 hours at 80° C.

The resulting polymer has a glass transition temperature of 197° C.

α-methylene-δ-valerolactone (α-MδVL)

REFERENCE EXAMPLE 32

A solution of 1000 parts α-MδVL and 1 part t-butyl per-2-ethyl hexanoate was polymerized according to the chamber method between glass plates 9.5 hours at 80° C.

The resulting polymer has a glass transition temperature of 186° C. and a weight loss of 31% after 30 min at 300° C.

EXAMPLE 33

A solution of 500 parts α-MδVL, 500 parts methylmethacrylate, 2.5 parts thioglycolic acid-2-ethylhexyl ester, 1.5 parts t-dodecyl mercaptan and 1 part 2,2'-azobis(isobutyronitrile) was polymerized according to the chamber method between glass plates 5 hours at 80° C.

The resulting polymer has a glass transition temperature of 188° C. and a weight loss of 24.1% after 30 min at 300° C.

EXAMPLE 34

A solution of 650 parts α-MδVL, 350 parts styrene and 1 part t-butyl per-2-ethyl hexanoate was polymerized according to the chamber method 8 hours at 80° C.

The resulting polymer has a glass transition temperature of 199° C. and a weight loss of 13.6% after 30 min at 300° C.

EXAMPLE 35

A solution of 850 parts α-MδVL, 150 parts n-butylmethacrylate and 1 part t-butyl per-2-ethyl hexanoate was polymerized according to the chamber method 7 hours at 80° C.

The resulting polymer has a glass transition temperature of 182° C. and a weight loss of 27.7% after 30 min at 300° C.

α-methylene-γ-dimethyl-δ-valerolactone (α-MγγMδVL)

EXAMPLE 36

A solution of 500 parts α-MγγMδVL, 500 parts styrene, 2.5 parts thioglycolic acid-2-ethylhexyl ester, 1.5 parts t-dodecyl mercaptan and 20 parts dibenzoyl peroxide was polymerized according to the chamber method 11 hours at 80° C.

The resulting polymer has a glass transition temperature of 155° C.

α-methylene-β-methyl-δ-dimethyl-δ-valerolactone (α-MβMδδMδVL)

REFERENCE EXAMPLE 37

A solution of 1000 parts α-MβMδδMδVL and 10 parts dibenzoyl peroxide was polymerized according to the chamber method 7.5 hours at 80° C.

The resulting polymer has a glass transition temperature of >300° C.

EXAMPLE 38

A solution of 500 parts α-MβMδδMδVL, 500 parts methylmethacrylate, 2.5 parts thioglycolic acid-2-ethylhexyl ester, 1.5 parts t-dodecyl mercaptan and 9 parts 2,2-azobis(isobutyronitrile) was polymerized according to the chamber method 16 hours at 75° C.

The resulting polymer has a glass transition temperature of 188° C. and a weight loss of 94% after 30 min at 300° C.

EXAMPLE 39

A solution of 500 parts α-MβMδδMδVL, 500 parts styrene, 2.5 parts thioglycolic acid-2-ethylhexyl ester, 1.5 parts t-dodecyl mercaptan and 10 parts dibenzoyl peroxide was polymerized according to the chamber method 5 hours at 80° C.

The resulting polymer has a glass transition temperature of 201° C.

α-methylene-β-ethyl-γ-butyrolactone (α-MβEγBL)

REFERENCE EXAMPLE 40

A solution of 1000 parts α-MβEγBL and 2 parts 2,2-azobis(isobutyronitrile) was polymerized according to the chamber method 4.5 hours at 75° C.

The resulting polymer has a glass transition temperature above 300° C. (decomposition without melting point) and a weight loss of 16.4% after 30 min at 300° C.

EXAMPLE 41

A solution of 500 parts α-MβEγBL, 500 parts methylmethacrylate and 2 parts 2,2-azobis(isobutyronitrile) was polymerized 4.5 hours at 75° C.

The resulting polymer has a glass transition temperature of 205° C. and a weight loss of 21.3% after 30 min at 300° C.

EXAMPLE 42

A solution of 200 parts α-MβEγBL, 800 parts methylmethacrylate, 2.5 parts thioglycolic acid-2-ethylhexyl ester and 1 part 2,2'azobis(isobutyronitrile) was polymerized 6 hours at 75° C. and one hour at 85° C.

The resulting polymer has a glass transition temperature of 155° C.

α-methylene-β-methyl-γ-methyl-γ-butyrolactone
(α-MβMγMγBL)

REFERENCE EXAMPLE 43

A solution of 1000 parts α-MβMγMγBL and 5 parts dibenzoyl peroxide was polymerized 5 hours at 85° C.

The resulting polymer has no unambiguous glass transition temperature and a weight loss of 5.0% after 30 min at 300° C.

EXAMPLE 44

A solution of 500 parts α-MβMγMγBL, 500 parts methylmethacrylate and 5 parts dibenzoyl peroxide was polymerized 5 hours at 85° C.

The resulting polymer has a glass transition temperature of 190° C. and a weight loss of 7.8% after 30 min at 300° C.

The conditions for the homo- and copolymerization and the characterization by glass transition temperature, weight loss (30 min at 300° C.) and the optical evaluation are summarized again in Table 1.

TABLE 1

| Ex./Ref. Ex. | Monomer | Amt. % by wt. | Initiator | Amt. % by wt. | Chain Transfer Agent | Amt. % by wt. | Polymerization Temp. °C. | Polymerization Time (min.) | Glass Transition Temp. °C. | Weight Loss (30 min/ 300° C.) TG (B) | Optics (Clear/ Opaque) |
|---|---|---|---|---|---|---|---|---|---|---|---|
| 1 | α-MγBγBL | 100 | t-BPEH | 0.25 | TGEH | 0.25 | 60 | 240 | 146° C. | 2.6% | clear |
|  |  |  | DTBP | 0.03 | t-DDM | 0.15 | 90 | 60 |  |  |  |
|  |  |  |  |  |  |  | 140 | 60 |  |  |  |
| 2 | α-MγBγBL | 50 | t-BPEH | 0.10 |  |  | 80 | 480 | 120° C. |  | clear |
|  | MMA | 50 |  |  |  |  |  |  |  |  |  |
| 2a | α-MγBγBL | 40 | LPO | 0.25 | TGEH | 0.35 | 80 | 120 |  |  | clear |
|  | MMA | 60 |  |  | t-DDM | 0.15 | 94 | 60 |  |  |  |
| 3 | α-MγBγBL | 85 | t-BPEH | 0.10 |  |  | 80 | 270 | 110° C. |  | clear |
|  | n-MBA | 15 |  |  |  |  |  |  |  |  |  |
| 4 | α-MγMγBL | 100 | t-BPEH | 0.10 |  |  | 60 | 570 | 229° C. | 3.5% | clear |
| 5 | α-MγMγBL | 50 | t-BPEH | 0.10 |  |  | 90 | 300 | 167° C. | 4.4% | Slightly Opaque |
|  | MMA | 50 |  |  |  |  |  |  |  |  |  |
| 6 | α-MγMγBL | 85 | t-BPEH | 0.10 |  |  | 80 | 240 | 211° C. |  | Slightly Opaque |
|  | n-BA | 15 |  |  |  |  |  |  |  |  |  |
| 7 | α-MγMγBL | 85 | t-BPEH | 0.10 |  |  | 80 | 300 | 200° C. |  |  |
|  | n-BMA | 15 |  |  |  |  |  |  |  |  |  |
| 8 | α-MγMγBL | 50 | LPO | 0.10 |  |  | 70 | 360 | 161° C. |  | clear |
|  | Styrol | 50 |  |  |  |  |  |  |  |  |  |
| 9 | α-MγHγBL | 100 | ADMV | 0.60 |  |  | 90 | 210 | 105° C. |  |  |
|  |  |  |  |  |  |  | 100 | 120 |  |  |  |
| 10 | α-MγHγBL | 70 | ADMV | 0.30 | GDMA | 0.29 | 100 | 180 | 126° C. |  |  |
|  | α-MγBL |  |  |  |  |  |  |  |  |  |  |
| 11 | α-MγBL | 100 | t-BPEH | 0.08 | TGEH | 0.30 | 70 | 60 | 188° C. | 0.4 |  |
| 12 | α-MγBL | 65 | t-BPEH | 0.18 | TGEH | 0.30 | 70 | 180 | 166° C. | 1.8 |  |
|  | Styrol | 35 |  |  |  |  | 150 | 120 |  |  |  |
| 13 | α-MγBL | 50 | VAZO 88 | 0.10 | TGEH | 0.20 | 85 | 240 | 135° C. |  |  |
|  | MMA | 50 |  |  |  |  | 115 | 60 |  |  |  |
| 13a | α-MγBL | 80 | t-BPEH | 0.08 | TGEH | 0.30 | 70 | 60 |  | 1.0 |  |
|  | MMA | 20 |  |  |  |  | 120 | 120 |  |  |  |
| 13b | α-MγBL | 20 | AIBN | 0.05 | TGEH | 0.35 | 75 | 210 | 133° C. | 10.8 | Opague |
|  | MMA | 80 |  |  |  |  | 120 | 180 |  |  |  |
| 14 | α-MγBL | 50 | ADMV | 0.03 | GDMA | 0.29 | 100 | 40 | 172° C. |  |  |
|  | α-MγBγBL | 50 |  |  |  |  | 130 | 150 |  |  |  |
| 15 | γ-MγBL | 100 | AIBN | 2.0 |  |  | 80 | 840 | 165° C. | 9.3 | clear |
| 16 | α-MβMγBL | 100 | tBPEH | 0.10 |  |  | 80 | 300 | >300° C. | 3.5 | clear |
| 17 | α-MβMγBL | 20 | AIBN | 0.20 | TGEH | 0.25 | 80 | 180 | 159° C. | 9.8 | clear |
|  | MMA | 80 | DTBP | 0.03 | tDDM | 0.20 | 90 | 60 |  |  |  |
|  |  |  |  |  |  |  | 140 | 60 |  |  |  |
| 17a | α-MβMγBL | 20 | LPO | 1.00 | TGEH | 0.35 | 80 | 120 |  |  | clear |
|  | MMA | 80 |  |  | t-DDM | 0.15 | 94 | 60 |  |  |  |
| 18 | α-MβMγBL | 50 | AIBN | 0.10 |  |  | 80 | 420 | 186° C. |  | clear |
|  | n-BMA | 50 |  |  |  |  |  |  |  |  |  |
| 19 | α-MβMγBL | 100 | AIBN | 1.00 |  |  | 80 | 180 | 220° C. | 24.0 | clear |
| 20 | α-MβMγBL | 50 | AIBN | 0.50 |  |  | 80 | 180 | 162° C. | 30.5 | clear |
|  | MMA | 50 |  |  |  |  |  |  |  |  |  |
| 21 | α-MβMγBL | 50 | AIBN | 0.3 |  |  | 80 | 720 | 150° C. |  | clear |
|  | Styrol | 50 |  |  |  |  |  |  |  |  |  |

TABLE 1-continued

| Ex./ Ref. Ex. | Monomer | Amt. % by wt. | Initiator | Amt. % by wt. | Chain Transfer Agent | Amt. % by wt. | Polymerization Temp. °C. | Polymerization Time (min.) | Glass Transition Temp. °C. | Weight Loss (30 min/ 300° C.) TG (B) | Optics (Clear/ Opaque) |
|---|---|---|---|---|---|---|---|---|---|---|---|
| 22 | α-MββMγBL | 50 | BPO | 0.50 | | | 85 | 420 | 160° C. | | clear |
| | Styrol | 50 | | | | | 95 | 60 | | | |
| 23 | α-MγγMγBL | 100 | AIBN | 0.60 | | | 80 | 360 | 211° C. | 12.1% | clear |
| 24 | α-MγγMγBL | 50 | AIBN | 0.60 | TGEH | 0.25 | 80 | 360 | 160° C. | 11.1% | clear |
| | MMA | 50 | | | tDDM | 0.15 | | | | | |
| 25 | α-MγγMγBL | 50 | AIBN | 1.0 | TGEH | 0.25 | 80 | 420 | 155° C. | | clear |
| | Styrol | 50 | | | tDDM | 0.15 | | | | | |
| 26 | α-MβMγγMγBL | 100 | AIBN | 1.0 | TGEH | 0.25 | 80 | 840 | | | Slightly Opaque |
| | | | | | tDDM | 0.15 | | | | | |
| 27 | α-MβMγγMγBL | 50 | BPO | 2.00 | TGEH | 0.25 | 80 | 840 | 177° C. | | clear |
| | MMA | 50 | | | tDDM | 0.15 | | | | | |
| 28 | α-MβMγγMγBL | 50 | BPO | 2.00 | TGEH | 0.25 | 80 | 840 | 185° C. | | clear |
| | Styrol | 50 | | | tDDM | 0.15 | | | | | |
| 29 | MOBCO | 100 | BPO | 1.00 | | | 80 | 480 | 200° C. | 7.2% | clear |
| 30 | MOBCO | 50 | AIBN | 0.70 | | | 80 | 300 | 149° C. | 16.2% | clear |
| | MMA | 50 | | | | | 90 | 720 | | | |
| 31 | MOBCO | 50 | BPO | 2.00 | TGEH | 0.25 | 80 | 840 | 197° C. | | clear |
| | Styrol | 50 | | | tDDM | 0.15 | | | | | |
| 32 | α-MδVL | 100 | tBPEH | 0.10 | | | 80 | 570 | 186° C. | 31% | clear |
| 33 | α-MδVL | 50 | AIBN | 0.10 | TGEH | 0.25 | 80 | 300 | 188° C. | 24.1% | opaque |
| | MMA | 50 | | | tDDM | 0.15 | | | | | |
| 34 | α-MδVL | 65 | tBPEH | 0.10 | | | 80 | 480 | 199° C. | 13.5% | clear |
| | Styrol | 35 | | | | | | | | | |
| 35 | α-MδVL | 85 | tBPEH | 0.10 | | | 80 | 420 | 182° C. | 27.7 | opaque |
| | n-BMA | | | | | | | | | | |
| 36 | α-MγγMδVL | 50 | BPO | 2.00 | TGEH | 0.25 | 80 | 660 | 155° C. | | clear |
| | Styrol | 50 | | | tDDM | 0.15 | | | | | |
| 37 | αMβMδδMδVL | 100 | BPO | 1.00 | | | 80 | 450 | >300° C. | | clear |
| 38 | αMβMδδMδVL | 50 | AIBN | 0.90 | TGEH | 0.25 | 75 | 960 | 188° C. | 94% | opaque |
| | MMA | 50 | | | tDDM | 0.15 | | | | | |
| 39 | αMβMδδMδVL | 50 | BPO | 1.00 | TGEH | 0.25 | 80 | 300 | 201° C. | | clear |
| | Styrol | 50 | | | tDDM | 0.15 | | | | | |
| 40 | α-MβEγBL | 100 | AIBN | 0.20 | | | 75 | 270 | >200° C. | 16.4% | clear |
| 41 | α-MβEγBL | 50 | AIBN | 0.20 | | | 75 | 270 | 205° C. | 21.3% | clear |
| | MMA | 50 | | | | | | | | | |
| 42 | α-MβEγBL | 20 | AIBN | 0.10 | TGEH | 0.25 | 75 | 360 | 155° C. | | clear |
| | MMA | 80 | | | | | 85 | 60 | | | |
| 43 | α-MβMγMγBL | 100 | LPO | 0.50 | | | 85 | 300 | | 5.0 | clear |
| 44 | α-MβMγMγBL | 50 | LPO | 0.50 | | | 85 | 300 | 190° C. | 7.8 | clear |
| | MMA | 50 | | | | | | | | | |

Vicat temperature, elastic modulus, tensile strength, ball-puncture resistance and impact strength were measured for a few selected polymers according to the pertinent DIN specifications, which are indicated e.g. earlier in the text or in conjunction with Table 2. The results are collated in Table 2.

Formed plastic parts can be produced from the molding material granulates by injection molding which are suited for checking the mechanical data of the homo- and copolymers. Table 2 indicates the characteristic values measured for the specimens.

TABLE 2

| Example/ reference example | Vicat (°C.) DIN 53460 | Elastic (N/mm$^2$) DIN 53457 | Tensile strength (N/mm$^2$) DIN 53455 | Ball-puncture resistance (N/mm$^2$)DIN 53453 | Impact strength (kg/m$^2$) DIN 53453 |
|---|---|---|---|---|---|
| 1 | 111 | 1800 | 17 | 99.4[2] | 4 |
| 11 | 182 | 6600 | 50 | 490[3] | 6 |
| 12 | 152 | 4100 | 53 | 320[3] | 9 |
| 13a | 162 | 6000 | 43 | 420[3] | 6 |
| 13b | 118 | / | / | / | 16 |
| 17 | 141 | 3700[1] | / | 213[3] | 16 |

[1] DMTA
[2] Load 357.9N
[3] Load 961.0N

Reference example 1: 100% α-MγBγBL
Reference example 11: 100% α-MγBL
Example 12: 65% α-MγBL/35% styrene
Example 13a: 80% α-MγBL/20% MMA
Example 13b: 20% α-MγBL/80% MMA
Example 17: 20% α-MβMγBL/80% MMA Table 3 collates once again the refraction indices of various polymers according to DIN 43 491.

| Example/reference example | Polymer | $n_D$ (23° C.) |
|---|---|---|
| 1 | α-MγBγBL | 1,500 |
| 11 | α-MγBL | 1,540 |
| 13a | 20 MMA<br>80 α-MγBL | 1,532 |
| 16 | α-MβMγBL | 1,518*) |
| 17 | 80 MMA<br>20 α-MβMγBL | 1,497 |
| — | 100 MMA (Degalan P8) | 1,492 |

*)determined by computer

It is remarkable that the refraction index of the copolymers of MMA with exo-methylene lactones is higher than that of PMMA. This permits the copolymers to be used in optical waveguides, e.g. in order to produce the highest possible difference between core (high refraction index) and shell (low refraction index). Furthermore, the damping of the light which is brought about in particular by C-H oscillations is favorable because the greater C:H ratio in the lactone monomer in comparison to MMA has an advantageous effect here.

Table 4 collates once again the values for the weight loss TG(A), TG(B)) of selected polymers:

| Example/<br>reference<br>ex. | Amount | Polymer/<br>Copolymer | TG(A)<br>(%) | TG(B)<br>(%) |
|---|---|---|---|---|
| — | 100 | MA (Degalan ® P8) | 0,7 | 10,1 |
| 11 | 100 | α-MγBL | 0,2 | 0,4 |
| 1 | 100 | α-MγBγBL | 0,9 | 2,6 |
| 13a | 80<br>20 | α-MγMBL<br>MMA | 0,3 | 1,0 |
| 13b | 80<br>20 | MMA<br>α-M-γBL | 0,4 | 10,8 |
| 17 | 80<br>20 | MA<br>α-MβMγBL | 1,7 | 9,8 |
| 12 | 35<br>65 | styrene<br>α-MγBL | 0,7 | 1,8 |

The weight loss determined by thermogravimetry is a measure for the thermal resistance of the polymers tested. The smaller the numerical value for TG(A) or TG(B) the better the thermal resistance of the specimen.

In addition, the wear resistance was tested using a few selected polymers.

The wear resistance test took place by loading on a frictional wheel test device (Taber abrader, model: 503; standard abrasion tester) in accordance with DIN 52 347. Type CS10F was used as a frictional wheel. The test weight was 250 g. After 10 cycles the plates were evaluated. The difference of the degree of gloss before and after the test at a measuring angle of 60° was taken as measure for the wear resistance. The measuring of gloss was carried out with a multi-gloss measuring device type 4060 of the Byk Gardner company. Various commercial plastics were measured for comparison. Since plates of these various plastics have very different glosses, it is logical not to compare the absolute values but rather the difference of the glosses. Table 5 shows the results:

| Plastic | Example | Gloss<br>(before) | Gloss<br>(after) | |
|---|---|---|---|---|
| MMA/αMβMγBL 80/20 | 17 | 124 | 88 | 36 |
| PMMA Deglas ® | — | 131 | 88 | 43 |
| Polycarbonate Decarglas ® | — | 150 | 101 | 49 |
| Poly-αMγBγBL | 1 | 125 | 48 | 77 |

Moreover, the scratch resistance was examined in addition using a few copolymers by determining the scratch hardness and the surface hardness.

The examination of the scratch hardness took place with a Universal Scratch Tester 413 according to DIN 53 799—part 10. The measured values are presented in table 6; the values indicate the force required to damage the plate. The higher the value the harder the plate.

The so-called "cut test" according to Oesterle was used to characterize the surface hardness. In it the substrate surface can be tested for scratching with a duroplastic test disk. It was found thereby that MMA-/α-M-β-M-γ-BL copolymers with a 80/20 ratio are just as scratch-resistant as PMMA (Degalan P8). The measured values are indicated in Table 7.

TABLE 6

Measured values for the scratch resistance
of MMA-/α-M-β-M-γ-BL copolymers with an
80/20 ratio in comparison to PMMA and PC
Scratch hardness test according to DIN 53 799-part 10:

| Specimen | Measured value (N) |
|---|---|
| Polycarbonate (Decarglas ®) | 0.1 |
| PMMA (Degalan P8) | 0.85 |
| MMA-/α-M-β-M-≠-BL | 0.8 |

The value indicated the force at which a visible trace of a scratch occurs.

TABLE 7

Cut hardness test according to Oesterle
with a cut-hardness tester model 435 of the Erichsen
company and with duroplastic testing tool:

| Specimen | Measured value (N) |
|---|---|
| Polycarbonate (Decarglas ®) | <0.5 |
| PMMA (Degalan P8) | 2.7 |
| MMA-/α-M-β-M-γ-BL copolymer | 2.5 |

We claim:

1. A copolymer for producing cast glass or formed materials with elevated thermal dimensional stability, prepared by copolymerizing:

A) at least one α-methylene-γ-butyrolactone of formula II

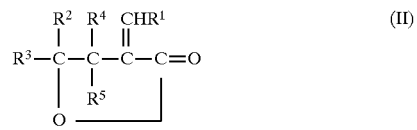

wherein $R^1$=H or $CH_3$, and $R^2$, $R^3$, $R^4$ and $R^5$ are the same or different and are H, $C_1$–$C_7$-alkyl or halogen, independently of each other, and the $C_1$–$C_7$-alkyl groups are branched or linear, N, P, or S heteroatom-substituted, O-alkyl substituted, or can carry halogen substitution and/or carbonyl groups, and B) at least one vinylically unsaturated monomer, with the proviso that a) copolymers of α-methylene-γ-butyrolactone with acrylonitrile, acrylic acid esters, butadiene, styrene, methylmethacrylate or bifunctional methacrylates, and b) copolymers of α-methylene-δ-valerolactone and styrene are excepted.

2. The copolymer according to claim 1, wherein one or both of $R^4$ and $R^5$ in the α-methylene-γ-butyrolactone of formula II are $C_1$–$C_7$.

3. The copolymer according to claim 2, wherein $R^4$ or $R^5$ in the α-methylene-γ-butyrolactone of formula II is methyl, ethyl, n-propyl, i-propyl, n-butyl, iso-butyl, tert-butyl, n-pentyl, neo-pentyl, hexyl or heptyl.

4. The copolymer according to claim 1, wherein one or both of $R^2$ and $R^3$ in the α-methylene-γ-butyrolactone of formula II are H, methyl or ethyl.

5. The copolymer according to claim 1, wherein the compound of formula II is α-methylene-β-methyl-γ-butyrolactone, α-methylene-β-ethyl-γ-butyrolactone, α-methylene-β-n-butyl-γ-butyrolactone, α-methylene-β-methyl-γ-methyl-γ-butyrolactone or α-methylene-β-methyl-γγ-dimethyl-γ-butyrolactone.

6. The copolymer according to claim 1, wherein the vinylically unsaturated monomer is selected from the group consisting of methylmethacrylate, n-butylmethacrylate, methylacrylate, ethylacrylate, n-butylacrylate, styrene, and mixtures thereof.

7. The copolymer according to claim 1, wherein the content of α methylene-γ-butyrolactone is 1–70% by weight relative to the total weight of the copolymer.

8. The copolymer according to claim 7, wherein the content of α-methylene-γ-butyrolactone is 5–50% by weight, relative to the total weight of the copolymer.

9. The copolymer according to claim 7, wherein the content of α-methylene-γ-butyrolactone is 10–30% by weight, relative to the total weight of the copolymer.

10. A thermally dimensionally stable cast glass bodies obtained by mass polymerization of a syrup in a chamber kiln wherein the syrup comprises:

A) At least one at least one α-methylene-γ-butyrolactone of formula II

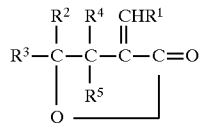

wherein $R^1$=H or $CH_3$, and $R^2$, $R^3$, $R^4$ and $R^5$ are the same or different and are H, $C_1$–$C_7$-alkyl or halogen, independently of each other, and the $C_1$–$C_7$-alkyl groups are branched or linear, N, P, or S heteroatom-substituted, O-alkyl substituted, or can carry halogen substitution and/or carbonyl groups, and B) at least one vinylically unsaturated monomer with the proviso that a) copolymers of α-methylene-γ-butyrolactone with acrylonitrile, acrylic acid esters, butadiene, styrene, methylmethacrylate or bifunctional methacrylates, and b) copolymers of α-methylene-δ-valerolactone and styrene are excepted.

11. The cast glass body according to claim 10, wherein the average molecular weight of the copolymer consisting of components A) and B) is 500,000–5,000,000.

12. The cast glass body according to claim 11, wherein the average molecular weight is 1,000,000–3,000,000.

13. The copolymer according to claim 1, wherein the average molecular weight is between 50,000 and 250,000.

14. A thermally dimensionally stable formed material containing a copolymer according to claim 1.

15. A copolymer for producing cast glass or formed materials with elevated thermal dimensional stability, prepared by copolymerizing:

A) At least one exo-methylene lactone of the formula I

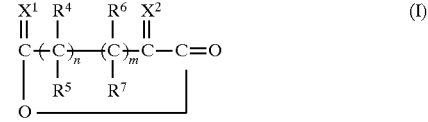

wherein n=0 or 1, m=0 or 1 and the sum n+m is either 1 or 2;

$X^1$ and $X^2$ each stand for =CH—$R^1$ or two single-bonded substituents $R^2$ and $R^3$, and only one of $X^1$ or $X^2$ is =CH—$R^1$, and where $X^1$ is =CH—$R^1$ the sum of n+m must be 1;

and wherein $R^1$, $R^2$, $R^3$, $R^4$, $R^5$, $R^6$ and $R^7$ are the same or different and are H, $C_1$–$C_7$-alkyl or halogen, independently of each other, and the $C_1$–$C_7$-alkyl groups are branched or linear, N, P, or S heteroatom-substituted, O-alkyl substituted, or can carry halogen substitution and/or carbonyl groups, wherein a 5 or 6-member ring is formed in part with two of groups $R^1$ to $R^7$, with B) at least one vinylically unsaturated monomer, with the proviso that a) copolymers of α-methylene-γ-butyrolactone with acrylonitrile, acrylic acid esters, butadiene, styrene, methylmethacrylate or bifunctional methacrylates, and b) copolymers of α-methylene-δ-valerolactone and styrene are excepted.

16. The copolymer of claim 1, further including a 5 or 6-member ring formed in part with groups $R^2$ or $R^3$ and with the groups $R^4$ or $R^5$.

17. A copolymer for producing cast glass or formed materials with elevated thermal dimensional stability, prepared by copolymerizing:

A) At least one γ-methylene-γ-butyrolactone of the formula III

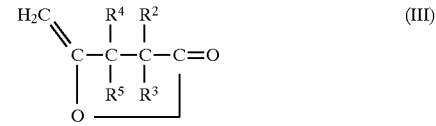

wherein $R^2$, $R^3$, $R^4$ and $R^5$ are the same or different and are H, $C_1$–$C_7$-alkyl or halogen, independently of each other, and the $C_1$–$C_7$-alkyl groups are branched or linear, N, P, or S heteroatom-substituted, O-alkyl substituted, or can carry halogen substitution and/or carbonyl groups, and wherein a 5 or 6-member ring is formed in part with two of groups $R^1$ to $R^7$ with B) at least one vinylically unsaturated monomer, with the proviso that a) copolymers of α-methylene-γ- butyrolactone with acrylonitrile, acrylic acid esters, butadiene, styrene, methylmethacrylate or bifunctional methacrylates, and b) copolymers of α-methylene-δ-valerolactone and styrene are excepted.

18. A copolymer for producing cast glass or formed materials with elevated thermal dimensional stability, prepared by copolymerizing:

A) At least one α-methylene-δ-butyrolactone of the formula IV

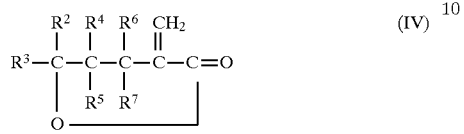

wherein $R^2$, $R^3$, $R^4$ and $R^5$ are the same or different and are H, $C_1$–$C_7$-alkyl or halogen, independently of each other, and the $C_1$–$C_7$-alkyl groups are branched or linear, N, P, or S heteroatom-substituted, O-alkyl substituted, or can carry halogen substitution and/or carbonyl groups, and wherein a 5 or 6-member ring is formed in part with two of groups $R^1$ to $R^7$ with B) at least one vinylically unsaturated monomer, with the proviso that a) copolymers of α-methylene-γ-butyrolactone with acrylonitrile, acrylic acid esters, butadiene, styrene, methylmethacrylate or bifunctional methacrylates, and b) copolymers of α-methylene-δ-valerolactone and styrene are excepted.

19. The copolymer of claim 10, further including a 5 or 6-member ring formed in part with two of groups $R^1$ to $R^7$.

20. The copolymer according to claim 1, wherein

A) is α-methylene-β-methyl-γ-butyrolactone, wherein $R^1$, $R^2$, and $R^3$=H, $R^4$=$CH_3$, and $R^5$=H or wherein $R^1$, $R^2$, and $R^3$=H, $R^4$=H, and $R^5$=$CH_3$; and B) is selected from methylmethacrylate, n-butylmethacrylate and styrene.

21. The copolymer according to claim 20, wherein B) is methylmethacrylate.

22. The copolymer of any one of claims 15–20, wherein the compound of formula I or II is 4-methylene-2-oxa-bicyclo-[3.3.0]-octan-3-one.

23. The copolymer according to claim 1, wherein the vinylically unsaturated monomer is selected from the group consisting of methylmethacrylate, n-butylmethacrylate, styrene and mixtures thereof.

24. The copolymer according to claim 1, wherein the vinylically unsaturated monomer is methylmethacrylate, and the methylmethacrylate makes up at least 50% by weight of the total weight of the copolymer, and wherein the glass transition temperature of the copolymer obtained is greater than 120° C. and wherein the copolymer is transparent and clear.

* * * * *